J. W. THOMPSON.
HARVESTER.
APPLICATION FILED SEPT. 16, 1916. RENEWED DEC. 20, 1917.
1,271,803.
Patented July 9, 1918.
2 SHEETS—SHEET 2.
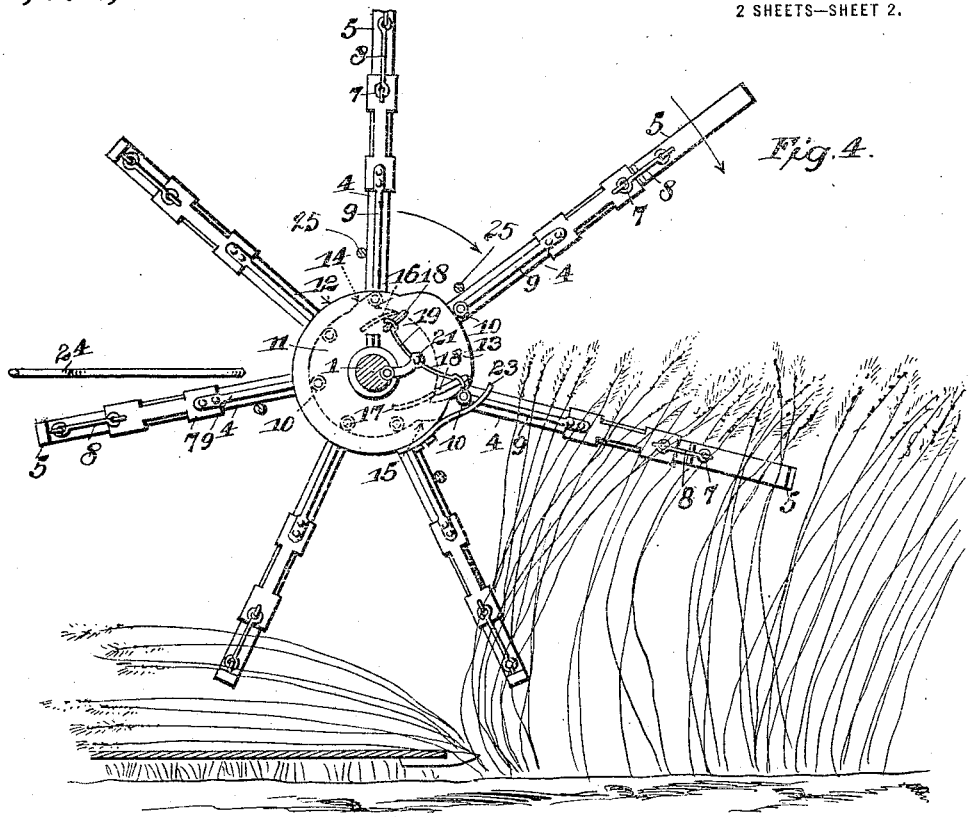
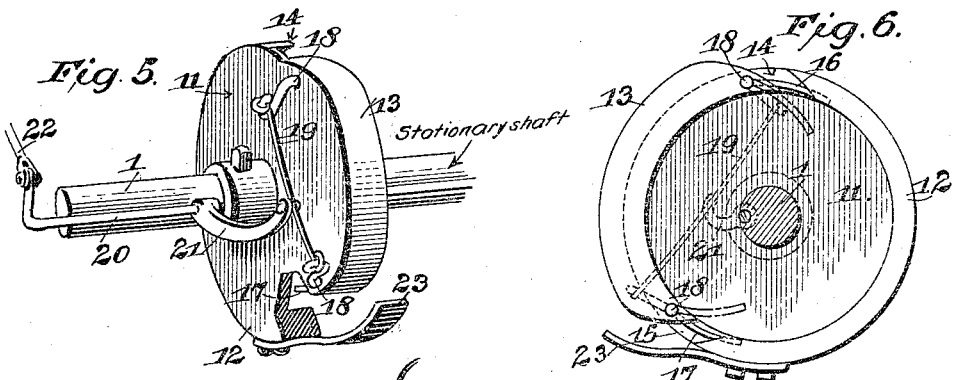
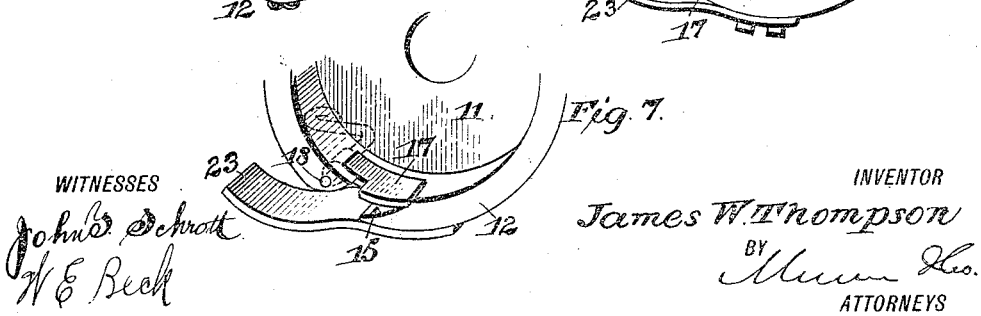
WITNESSES
INVENTOR
James W. Thompson
BY
ATTORNEYS

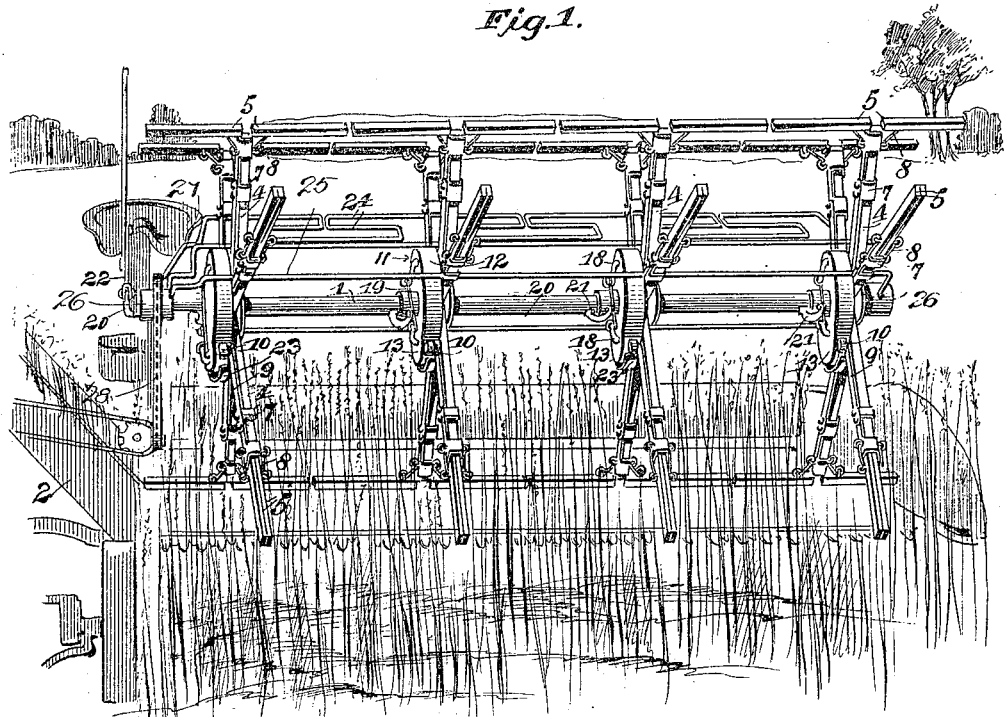

UNITED STATES PATENT OFFICE.

JAMES W. THOMPSON, OF SPOKANE, WASHINGTON.

HARVESTER.

1,271,803.  Specification of Letters Patent.  Patented July 9, 1918.

Application filed September 16, 1916, Serial No. 120,462. Renewed December 20, 1917. Serial No. 208,146.

*To all whom it may concern:*

Be it known that I, JAMES W. THOMPSON, a citizen of the United States, and a resident of Spokane, in the county of Spokane and State of Washington, have invented new and useful Improvements in Harvesters, of which the following is a specification.

My invention is an improvement in harvesters, and has for its object to provide an attachment for use in connection with the reel of a harvester for picking up fallen grain and laying it over upon the grain table, wherein the reel consists of series of radial arms, each having reel slats capable of taking a position in alinement with the arm or at right angles thereto, and extending in opposite directions, and having means in connection with the reel for changing the position of the slats to cause them to engage beneath the fallen grain, pick the same up and lay the grain over upon the grain table, and to afterward release the said grain, and wherein means is provided for moving the reel slats into and out of operative position.

In the drawings:

Figure 1 is a perspective view of a portion of the harvester provided with the improvement, Fig. 2 is a front view partially in section of one of the arms with the reel slats in inoperative position, Fig. 3 is a similar view with the slats in inoperative position, Fig. 4 is an end view of the reel with the supporting shaft in section, Fig. 5 is a perspective view of one of the cams, Fig. 6 is a side view of the same from the inner side, Fig. 7 is a partial perspective view showing the switch mechanism for the controlling rollers, and Fig. 8 is a view similar to Fig. 6 showing a modified construction of switch operating mechanism.

The present embodiment of the invention is shown in connection with the supporting shaft 1 for the reel of a harvester indicated at 2, and the shaft is provided at spaced intervals with sleeves 3 having spaced marginal radially extending flanges, and each sleeve supports a series of arms 4, seven in the present instance, the inner ends of the arms being received between the flanges of the sleeves, and the sleeves are mounted to rotate on the shaft. A pair of reel slats 5 is hinged to the outer end of each arm 4 by means of hinges 6, the reel slats being so connected that they will swing into parallelism and into alinement with the arm as shown in Fig. 2, or in opposite directions, and into a position at right angles to the arm, as shown in Fig. 3.

The slats are operated by means of a sliding bracket 7 mounted upon the arm and consisting of a pair of spaced rigidly connected sleeves, and the outermost sleeve is connected to the slats by means of links 8 in such manner that when the bracket is moved on the arm, the slats will be swung. A controlling link 9 is secured to the inner end of each bracket 7, and each link 9 has an outwardly extending lug or journal pin at its inner end upon which is journaled a roller 10. The rollers of the arms of each series are controlled by a cam secured to the shaft 1 adjacent to the series, each cam consisting of a disk 11 having a marginal flange 12—13, to be later described.

The portions 12 and 13 of the flange are concentric, but of unequal radius, and at their adjacent ends the flange has passages 14 and 15 for the rollers 10 for permitting the said rollers to pass within the flange or outside of the same. Switch plates or gates 16 and 17 are arranged at the passages 14 and 15 respectively, each gate being secured to a shaft 18 journaled in the flange 13 at the ends thereof, and each shaft 18 has a crank arm at the outer face of the disk 11. These crank arms are connected by a link 19, and the operating mechanism for the gates is connected with the link.

The said mechanism consists of a controlling shaft 20 which is journaled in a longitudinally extending groove in the shaft 1, and at each cam 11—12—13 the shaft has a radial arm 21, which at its outer end is pivoted to the adjacent link 19 intermediate the ends thereof. Suitable operating mechanism indicated at 22 is connected with a radial arm at one end of the shaft 20, and by means of the said operating mechanism, the arms 21 may be swung in unison to move the links 19 and to simultaneously open or close the gates. The gates are arranged as shown in Fig. 6, in such manner that when the link is moved in one direction, both are open, while when it is moved in the opposite direction, both are closed. The passage 14 is the exit passage for the rollers 10, while the passage 15 is the inlet or entrance passage, and a guide plate 23 is arranged at the said passage 15 to constrain the rollers to enter the said passage.

The arrangement is such that when the gates are open, the rollers 10 will move as indicated in Fig. 4, passing out at the passage 14 and over the high portion of the cam 13 and through the passage 15 into the interior of the flange, moving the reel slats into the position of Fig. 2 whenever they are on the high portion of the cam 13, and moving the slats into the position of Fig. 3 when they are within the flange of the cam.

When the gates are closed, the rollers will run idly around the inner portion of the cam, and the reel slats will be held in the position of Fig. 3, the roller with the slats in this position acting in the same manner as the usual reel. Means is arranged at the rear of the reel and at the level of the shaft 1 for preventing the cut grain from being carried upward by the reel slats and over the front of the reel. The said mechanism comprises a guide 24 formed of wire or the like, and supported in fixed position, and bent to form a series of passages for receiving the arm with the slats 5 extended.

It will be evident that any cut grain carried up by the arms will be dislodged by this dislodging device 24. The corresponding arms of all of the series are connected by rods 25, which are spaced outwardly beyond the peripheries of the flanges in order to not interfere with the rollers 10 during their movement, and the ends of these rods have angular portions which are connected to sleeves 26 journaled on the ends of the shaft. Sleeve 26 at the inner end of the shaft is provided with a sprocket wheel 27, which is connected by a chain 28 with a moving part of the machine to operate the reel.

In operation, the reel being driven, with the gates closed and with the rollers inside the flange 12—13, the reel slats will be held at all times in the position of Fig. 3, and the standing grain will be knocked over upon the grain table in the usual manner. When, however, the grain has fallen forward away from the sickle, it is obvious that with the slats in the position of Fig. 3, or with the ordinary reel, the fallen grain will be merely pushed closer to the ground making it more difficult for the sickle to cut the same. When fallen grain is encountered, the operator will merely move the shaft 20 to open the gates of all of the cams. Now, when the rollers reach the passage 14 they will pass out upon the portion 13 of the cam, and the arrangement of the cams is such that this movement of the rollers will take place just as the arms are beginning to move downward at the front of the reel, and the reel slats will be thrown in the position of Fig. 2, so that they can enter between the stalks of the fallen grain. Just before the arms complete their downward movement, and when they are in a position about thirty degrees below the horizontal, the reel slats will begin to move outward beneath the fallen grain, and when the arms reach a position about thirty degrees from the vertical, this movement will be completed, and the fallen stalks will be lifted and laid over upon the grain table in the manner shown in Fig. 4.

It will be noticed from an inspection of Fig. 6, that the gates are more than gates, since they are also switches, constraining the rollers to move out through the passage 14.

In Fig. 8 is shown a modified form of operating mechanism for the gates. In this construction the link 19, which is connected with the arm 21, passes through the eyes of the crank arms 18, and coil springs 30 are arranged on opposite sides of the eyes between stops adjustable on the link and the arms. With this arrangement the connection between the operating mechanism for the switches, and the switches, is a yielding connection.

I claim:

1. A harvester reel comprising a fixed shaft, series of radial arms journaled to rotate about the shaft, a pair of reel slats hinged to the outer end of each arm and mounted to swing into alinement with the arm or outwardly away from each other in a position perpendicular to the arm, a bracket mounted to slide on each arm and connected to the reel slats to swing the same, a roller connected to the inner end of each bracket, a fixed cam on the shaft adjacent to each series of arms, each cam having a marginal flange consisting of portions of unequal radii, and having passageways between the said portions for permitting the rollers to pass within the portion of less diameter and out upon the portion of greater diameter, gates for closing the passages to retain the rollers within the flange and the reel slats in inoperative position, and a common operating means for simultaneously opening or closing all of the gates and for deflecting the rollers outwardly through the passages when open.

2. A harvester reel comprising a fixed shaft, series of radial arms journaled to rotate about the shaft, the series being apart from each other, a pair of reel slats hinged to the outer end of each arm and mounted to swing into alinement therewith or at right angles thereto in opposite directions, a roller connected with the slats of each arm and movable longitudinally of the arm, a fixed cam adjacent to each series, each cam having a marginal flange within which the rollers normally move to hold the slats extended at right angles to the arm, said flange having inlet and outlet passages for the rollers for permitting them to pass to the periphery of the flange to move the slats into alinement with the arm at certain points in their travel, and means for preventing escape of the rollers from within the flange and for constraining the rollers to move outside the flange.

3. A harvester reel comprising a fixed shaft, series of radial arms journaled to rotate about the shaft, the series being spaced apart from each other, a pair of reel slats hinged to the outer end of each arm and mounted to swing into alinement therewith or at right angles thereto in opposite directions, a roller connected with the slats of each arm and movable longitudinally of the arm, a fixed cam adjacent to each series, each cam having a marginal flange within which the rollers normally move to hold the slats extended at right angles to the arm, said flange having inlet and outlet passages for the rollers for permitting them to pass to the periphery of the flange to move the slats into alinement with the arm at certain points in their travel.

4. A harvester reel, comprising series of arms mounted to rotate about a common axis, each arm having a pair of reel slats connected with the end thereof to swing into alinement with the arm or at right angles thereto in opposite directions and parallel with the axis of the reel, means for controlling the slats of each series to extend the slats into alinement with the arm at a certain point in the rotation of the arm, and means for preventing said extension of the slats.

5. A harvester reel, comprising series of arms mounted to rotate about a common axis, each arm having a pair of reel slats connected with the end thereof to swing into alinement with the arm or at right angles thereto in opposite directions and parallel with the axis of the reel, means for controlling the slats of each series to extend the slats into alinement with the arm at a certain point in the rotation of the arm.

6. In a harvester reel, the combination with the reel arms, slats extending laterally from the outer ends of the arms and parallel with the axis of the reel and mounted to swing into alinement with the arms, means operated by the rotation of the reel for swinging the said slats into alinement with the arms at certain points in the travel of the arms, said means comprising rollers connected with the arms, a cam comprising a disk and a laterally extending marginal flange having its internal diameter uniform and having on its peripheral surface an eccentric portion and having passages at the ends of its eccentric portion for permitting the roller to pass outwardly upon the eccentric portion and inwardly to the interior of the flange, and means for deflecting the rollers out through the passages or for retaining them within the flange.

7. In a harvester reel, the combination with the reel arms, slats extending laterally from the outer ends of the arms and parallel with the axis of the reel, means operated by the rotation of the reel for swinging the said slats into alinement with the arms at certain points in the travel of the arms.

JAMES W. THOMPSON.

Witnesses:
  E. D. WELLER,
  JAMES A. BROWN.

Copies of this patent may be obtained for five cents each, by addressing the "Commissioner of Patents, Washington, D. C."